April 28, 1970 | R. M. MILLER | 3,509,564

IMAGE STORAGE DEVICE

Filed March 4, 1968 | 3 Sheets-Sheet 1

INVENTOR
R. M. MILLER
BY Norman D. McClaskey
ATTORNEY

April 28, 1970 R. M. MILLER 3,509,564

IMAGE STORAGE DEVICE

Filed March 4, 1968 3 Sheets-Sheet 2

United States Patent Office 3,509,564
Patented Apr. 28, 1970

3,509,564
IMAGE STORAGE DEVICE

Robert M. Miller, Convent Station, N.J. 07961
Filed Mar. 4, 1968, Ser. No. 710,337
Int. Cl. G01s 7/20
U.S. Cl. 343—7.9 4 Claims

ABSTRACT OF THE DISCLOSURE

A device for, and methods of, producing three dimensional images or replicas of physical objects are disclosed. A plurality of strands are held together, by a retaining sleeve, under a selected pressure which allows the strands to be displaced along an axis parallel to the retaining sleeve wall when the strand cross sections come into contact with the surface of an object.

BACKGROUND OF THE INVENTION

Field of the invention

The invention relates to the field of three dimensional replica or image creation and more particularly to a device for, and methods of, creating both convex and concave three dimensional replicas of physical objects.

Prior art

The mold is a widely used, well known means for creating, or storing, the replica of a model. In its prior art form, the finished mold is generally a rigid solid which contains the image of an object. Molds are made from such diverse matter as sands, clay, stamped or engraved metal, et cetera. However, regardless of the material or method used in making the mold, the end product is a rigid solid which does not lend itself to re-use in storing a second image after it has been used for a first image. Generally, additional apparatus, machinery, and/or furnaces or kilns are required in order to transform the material being used into a mold of the desired object.

SUMMARY OF THE INVENTION

Applicant's invention is a device, and methods of using the device, which facilitate image storage or mold making by eliminating the need for using the additional apparatus required in the prior art. Furthermore, applicant's invention provides a medium for use as a mold which is readily reuseable for the storage of different images.

Generally applicant's device is comprised of a plurality of strands, of selected length and cross section, contained in juxtaposition by a retaining sleeve. The strands are retained in the sleeve by exerting a selected pressure on them through the sleeve. However, the pressure is such that it allows the strands to be individually displaced along an axis parallel to the sleeve wall when a selected force is applied to their cross sections. Initially, the strands are aligned so that their cross sections form a plane surface. When the surface of an object is brought into contact with the cross sections of the bundle of strands, and a force perpendicular to the cross sectional surfaces is applied, the contours of the object's surface will result in various ones of the strands being displaced accordingly. The result is that a concave replica of the object is left in the cross sectional surface to which it is applied and a convex replica is created in the opposite surface. At this point, the pressure exerted on the strands by the retaining sleeve may be increased to lock them in place and the device may be used as either a mold or a stamp. When the device is to be used to store a different image, the pressure being exerted on the strands to lock them in place is removed and the strands are returned to their original position, their end cross sections again forming two plane surfaces.

In other words, the image stored in the device is erased. A second object may then be applied to a cross sectional surface, as described above, and a new image is formed.

In addition to using the direct application of an object to reproduce its replica, selected ones, or groups of the strands, may be individually displaced in a series of steps to form the desired image. More specifically, by merely knowing the dimensions of the desired object, it is possible to form its physical image by merely selectively displacing the appropriate strands. An obvious application of this technique is the use of the device in conjunction with a data processing system containing data describing the contours of the object desired. The data processing system is used to control a mechanical arm, similar to a stylus on a plotter, to selectively displace strands in accordance with the surface contour data it contains.

It is clear that the device can be used as a source of amusement as well as an industrial tool. When made of inexpensive materials, the device is an ideal image forming device suitable for use by children. Additionally, its appeal and applications may be increased by using brightly colored or multi-colored strands.

One advantage of applicant's device is that it may be used in making a mold without the use of additional apparatus or special processes such as firing. Another advantage is that the device is readily reuseable for storing different replicas or images. Yet another advantage is that both a concave and convex replica of a model are obtained simultaneously. A still further advantage of the invention is that it lends itself to use with data processing systems for the automated generation of models.

It is an object of this invention to utilize the combination of a plurality of strands, having selected lengths and cross sections, as an image storage device.

It is another object of this invention to reduce the cost of making molds, or forming replicas of objects, by employing a reuseable material as a storage medium.

It is yet another object of this invention to facilitate the automated generation of three dimensional models by data processing systems.

It is a more specific object of this invention to utilize a plurality of strands, contained in juxtaposition within a retaining sleeve, to form three dimensional replicas of objects.

It is a still further specific object to utilize the various optical and esthetic effects produced by manipulating and displacing a plurality of strands contained within a retaining sleeve as a source of amusement and entertainment.

Additional features, advantages and objects of the invention will become readily apparent to those skilled in the art upon reading the following detailed description in conjunction with the drawings described below.

DETAILED DESCRIPTION OF THE INVENTION

Referring to FIG. 1, a sideview of one configuration of the image storage device is shown which includes a plurality of strands 1, each being of length L, and a retaining sleeve or jacket 2. The strands may be plastic filaments, wooden rods or any other suitable material. Additionally, the length, and cross sections of the strands are optional. Obviously, the smaller the strand cross sections, the more accurately the replica they produce will be.

Figure 1A:
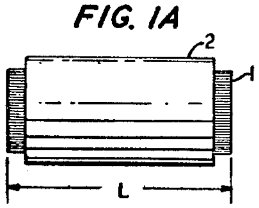
FIG. 1A is a side view of the image storage device.

As shown in FIG. 1, the device contains no image or replica and may be considered as being in its blank form. The retaining jacket 2 size is selected so that it exerts sufficient pressure on the strands 1 contained within it to keep them from moving when the device is rotated 90 degrees from the position shown. However, this pressure is such that individual strands 1 may be freely displaced along the horizontal axis, within the sleeve 2, by exerting a small force on the cross sectional surface of the strands. Consequently, if an object is pressed against the leftmost cross sectional areas of the strands 1 (FIG. 1A), it will displace the strands it comes in contact with to the right along the horizontal axis.

Figure 1B:
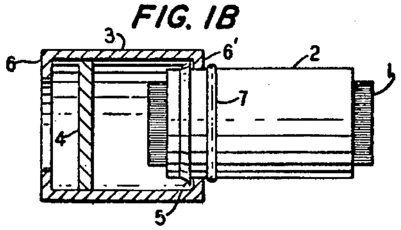
FIGS. 1B and 1C show the device of FIG. 1A with two types of caps used to keep the strands from being pushed out of the retaining sleeve.

Another version of the device in FIG. 1A, equipped with a cap, is shown in FIG. 1B. The purpose of the cap is to eliminate the possibility of the strands 1 being pushed out of the sleeve 2 when a mold is being made. The cap consists of a cylinder 3 with flanges 6 and 6' on each end, and slideable disk 4 inside the cylinder. The cylinder 3 is made of a flexible material, such as plastic, and it is connected to the sleeve 2 by pushing one end of it over the raised surface 5 protruding from the sleeve 2 but less than the outer diameter of raised to keep the cylinder 3 from sliding toward the other end of the sleeve when the device is used. The flanges 6 and 6', are of such a width that the end openings of cylinder 3 have a diameter slightly greater than the diameter of the sleeve 2 but less than the outer diameter of raised surface 5. Similarly, the outer diameter of the raised ring 7 on the sleeve is greater than the opening in either end of the cylinder 3.

In operation, if a force is applied to the strands 1 (FIG. 1B) from right to left, the strands 1 will slide through the sleeve 2, pushing disk 4 before them until the disk 4 reaches the left flange 6 of cylinder 3 and stops. Consequently, if the distance between the inner surface of the disk 4 and the end of the sleeve 2 within the cap is less than the length of the strands 1, the strands 1 cannot be pushed out of the sleeve. Such a configuration is especially desirable where the device is being used as a source of amusement for children.

Figure 1C:
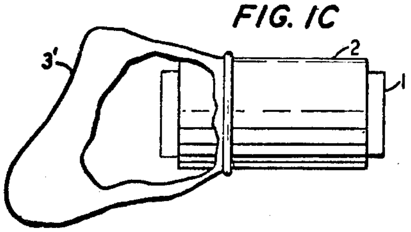

An alternative version of the FIG. 1B device is shown in FIG. 1C. In FIG. 1C, the cap is a piece of elastic material 3' covering the end of the sleeve 2. The size of this material is chosen to allow the strands 1 to move freely to the left a selected distance before any pressure is exerted on them. Or, alternatively, the size of the elastic material 3' is such that an object may be pressed rightwardly against it a selected distance before the material 3' impedes the further insertion of the object into the sleeve 2. In either case, the selected distance is less than the length of the sleeve 2.

Figure 2A:
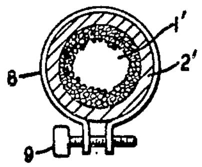
FIG. 2A shows an end view of the device shown in FIG. 1A which has a pressure band added for adjusting the pressure applied to the strands in the retaining sleeve.
Figure 2B:
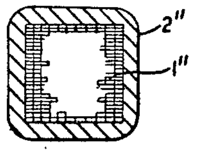
FIG. 2B shows one of the numerous cross sectional configurations the device itself, and the strands, may have.

Two of the numerous possible different cross sections the device may have are shown in FIGS. 2A and 2B, FIG. 2A shows a circular cross section of the device where the strands 1' also have a circular cross section. Additionally, FIG. 2A also shows a pressure band 8, or circular clamp, surrounding the sleeve 2' which can be adjusted by means of the thumbscrew 9. In the configuration in FIG. 2A, the sleeve 2' would be made of an elastic material which would respond to the band 8 being loosened or tightened. FIG. 2B shows a configuration of the device which has rectangular cross section and where the individual strands 1'' have rectangular cross sections. Clearly, the device cross section and the strand cross sections could also be elliptical, triangular, hexagonal, or any desired geometry. For instance, some commercially available plastic filaments have an × cross section. These filaments could be used as strands in the device.

In using the configuration of the device shown in FIG. 2A, the pressure band 8 is loosened by turning thumbscrew 9 until the only pressure exerted on the strands 1' is the pressure due to the retaining sleeve 2'. The object whose replica is to be formed is then pressed against the cross sectional surfaces of the strands 1' with a force directed perpendicularly toward the drawing. This will result in the strands 1' coming into contact with the object's surface being displaced in the direction of the applied force, leaving a concave replica of the object in the cross sectional area of the device shown in FIG. 2A. Additionally, a convex replica will be formed simultaneously in the other cross sectional area of the device. After the replicas have been formed, the pressure band 8 is tightened, by means of thumbscrew 9, locking the strands 1' in place. With the strands locked in place, the concave replica of the object stored in the device may be used as a mold. That is, this concave replica may be filled with a substance such as plaster of paris or clay to produce copies of the original object.

Figure 3A:
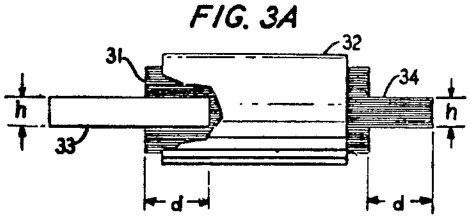
FIG. 3A is a side view of the device with a rectangular rod inserted which is useful in the detailed description.
Figure 3C:
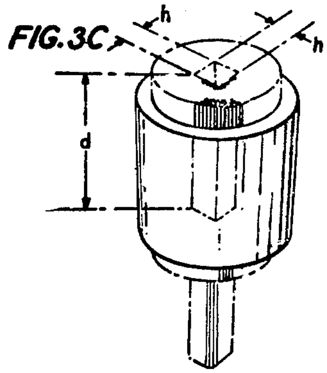
FIG. 3C is a perspective view of one end of the device showing the concave replica of the square rod.
Figure 3B:
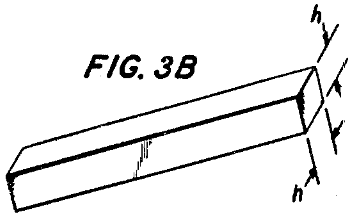
FIG. 3B shows a perspective view of the rod in FIG. 3A.
Figure 3D:
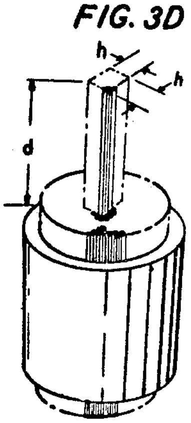
FIG. 3D is a perspective view of the other end of the device showing the convex replica of the square rod.

Referring to FIG. 3A, a section sideview of the device is shown with a rectangular rod 33 inserted to illustrate in detail how replicas are formed in the device. Prior to insertion of the rod 33, the strands of the device were all aligned as shown in FIG. 1A. The rod 33 (FIG. 3A) is then brought into contact with the strands 31 with a force directed toward the right. This rightwardly directed force is applied until rod 33 is inserted to the depth *d* shown in FIG. 3A. The insertion of rod 33 into the device a distance *d* results in the strands 34 being displaced a distance *d*. When the rod 33 is removed from the device, a concave replica of rod 33 will remain in the leftmost cross sectional surfaces of the strands 31. In this case, the replica will have a depth *d* and an $h \times h$ cross section. The convex replica of the rod 33 consists of the displaced strands 34 which have been displaced a distance *d*. These displaced strands 34 also have an $h \times h$ cross section. FIG. 3B shows a perspective of the rod 33 in FIG. 3A. Perspective views of the concave and convex replicas resulting from inserting the rod 33 (FIG. 3A) into the device are shown in FIGS. 3C and 3D respectively.

Figure 4A:
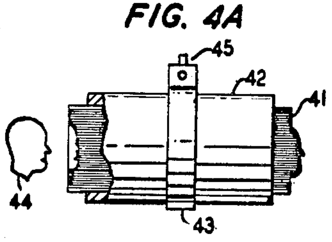
FIG. 4A shows the use of the device in storing the replica of a doll's face or a piece of statuary.
Figure 4B:
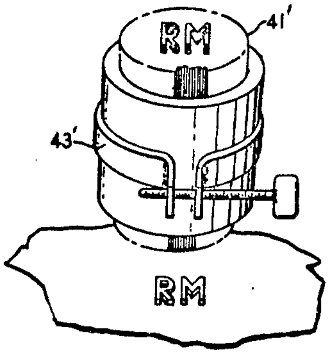
FIG. 4B shows the use of the device to store replicas of alphabetic characters.

FIGS. 4A and 4B are additional illustrating examples of the use of the device with objects having more complex contours. FIG. 4A shows the use of the device in forming the replica of a face 44 which could be a piece of statuary, a doll's face, et cetera. Here, as explained above, the object 44 is pushed against the aligned strands 41 while the pressure band 43 is loose. The strands 41 coming in contact with the contours of the object 44 are displaced, forming both a concave and a convex replica of the object. After the replicas have been formed, the strands 41 may be locked in place by turning thumbscrew 45 in a direction that tightens the pressure band 43.

Once the strands 41 have been locked in place to preserve the replicas, a number of things may be done with the device. For instance, as mentioned above, a substance such as a plaster of paris mixture can be poured into the concave replica and allowed to set. When the set mixture is removed, the side that was in contact with the surface of the concave replica will be a replica of the original face 44. Clearly, any substance which is initially pliable, and hardens with the passage of time could be used instead of the plaster mixture. Yet another example, where the strands 41 are made of plastic, is to apply a suitable solvent or adhesive material to either or both cross sectional areas of the strands which contain the replicas. If a solvent is used, it will react with the chemicals in the strands 41 causing them to fuse into a solid surface. Similarly, an adhesive material, upon drying, will hold the strands in place. Thus, in either case, a permanent solid replica of the face 44 can be obtained using only the storage device and a suitable solvent or adhesive material. An obvious area of application for these uses would be in the arts. However, the device would also find applications in those areas of industry that require the making and using of molds such as the manufacturing of mechanical parts.

FIG. 4B shows device being used to store replicas of alphabetic characters. It will be noted that using the letters RM shown in FIG. 4B, the convex replicas of the letters are normal and the concave replicas are mirror images or backwards. Consequently, if the mirror images of the letters RM are used as models, the convex replicas will also be mirror images or backwards letters. Having stored the replicas of the mirror images of RM, and tightened pressure band 43′, the concave replica may be used as a mold, as described above, to make copies of the letters. Similarly, the convex replica may be used as a stamp to reproduce images of the letters RM. In the latter application, covering the cross sectional area of the strands 41′ with an absorbent material such as felt might be desirable. However, in some cases, the capillary action of the strands will be such that no absorbent material will be required.

Using the device (FIG. 4B) as a stamp, the convex replica of the mirror images of RM are pressed upon an inking pad and then used to stamp RM on surfaces such as paper. While only the letters RM were discussed above, it is clear that complete names, addresses, and so on could also have been used. Consequently, the storage device can be said to be useful in forming replicas of alphabetic or, obviously, numerical symbols. When provided with a pressure band, the device is useful as a stamp. The above also demonstrates that the device has the advantage of being easily modified when used as a stamp.

Clearly, the device may also be used in creating alphameric displays which appear to jump from a plane surface. This latter application is useful in such areas as television.

Figure 5B:
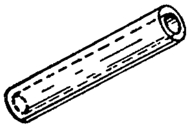
FIG. 5B shows a perspective of one type of strand that can be used in the application shown in FIG. 5A.
Figure 5A:
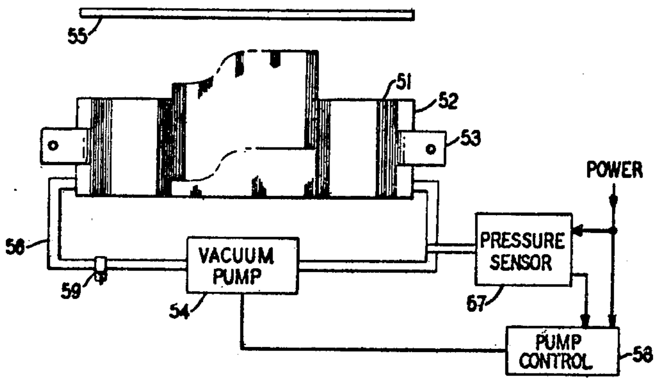
FIG. 5A shows the use of the device in conjunction with a vacuum pump and a sheet of plastic to form one half of a bottle.

Yet another use of the storage device is shown in FIG. 5A. Here, the image storage device has been used to store a replica of one half of a bottle. This configuration of the device differs from the above discussed configurations in that the strands 51 used are hollow. A perspective view of the type of strands 51 used in the configuration of the device in FIG. 5A is shown in FIG. 5B.

After the replicas of the bottle have been formed in the device, the pressure band 53 is tightened, locking them in place. The device is then inserted in a rigid adapter 56 whose other end is attached to a vacuum pump 54. As shown in FIG. 5A, the device is inserted in such a manner that the convex replica of the bottle is left exposed. However, the position of the device could just as well be reversed, having the concave replica exposed.

The vacuum pump is then started and begins to pump air through the adapter. While the pump is operating, a sheet of material 55 such as heated, pliable plastic is lowered over the exposed cross sectional surface of the device. This blocks the airflow through hollow strands 51. With the airflow blocked, the pump begins to lower the pressure inside the adapter 56 and the atmospheric pressure pushes the pliable sheet 55 snugly over the upper surface of the device. The degree of vacuum in the adapter chamber 57 is controlled automatically by the pressure sensor 57 and pump control 58. The pump is left on, maintaining the desired degree of vacuum inside the adapter chamber, until the sheet of material 55 cools and becomes rigid.

After the sheet 55 has become rigid, the pressure inside the adapted chamber is restored to atmospheric pressure by opening valve 59, and the rigid sheet is removed from the exposed surface of the device and trimmed, leaving one half of a bottle. The above process is repeated with a second sheet of material to obtain the second half of the bottle. The two halves are then fused together by means of a suitable heat or chemical process to obtain a whole bottle.

The above process may also be carried out where the strands 51 (FIG. 5A) are solid. In this case, the cross sections of the strands are chosen such that when they are held in the sleeve 52, there are small gaps between selected ones of their wall surface. These small gaps provide the necessary paths for airflow.

While the above discussion was in terms of making a bottle, it is clear that the same process could be used to make numerous different types of containers or to form innumerable different kinds of parts. Additionally, the material 55 used is not limited to plastic. Any material that is, or can be made pliable and later rendered rigid can be used.

Figure 6:
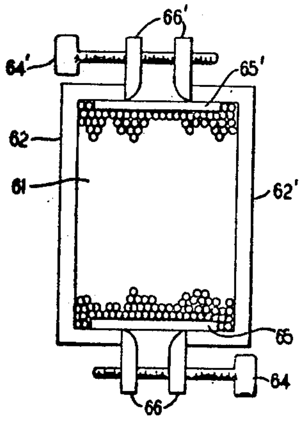
FIG. 6 shows a rectangular configuration of the device having an adjustable retaining sleeve.

In addition to the above discussed uses, the device may also be used in conjunction with certain kinds of data processing systems as an output, display, or storage device. Referring to FIG. 6, a rectangular version of the device is shown. The retainer sleeve in the configuration is in two halves 62 and 62′. These halves are joined by threaded bolts 64 and 64′ passing through flanges extending from each of the halves 62 and 62′ which contain threaded holes to accommodate the bolts. Additionally, thin sheets of material 65 and 65′ having dimensions approximately equal to the inside width and the depth of the combined sleeve halves are used to cover the gap between the respective halves of the sleeve. These sheets 65 and 65′ are provided to keep the strands from working into the gap between the halves of the sleeves when the bolts 64 and 64′ are loosened to reduce the pressure exerted by the sleeve. In essence, this configuration uses the above sleeve to perform the function that is performed by both the retaining sleeve 2 and pressure band 8 shown in FIG. 2. Returning to FIG. 6, the pressure exerted on the strands 61 is varied by either tightening or loosening bolts 64 and 64′. Thus, once replicas of an object have been stored in the device, while the sleeve is adjusted to exert only enough pressure to retain the strands 61, the bolts 64 and 64′ may be turned to tighten the sleeve 62 and 62′ and lock the strands 61 in place.

Figure 7:
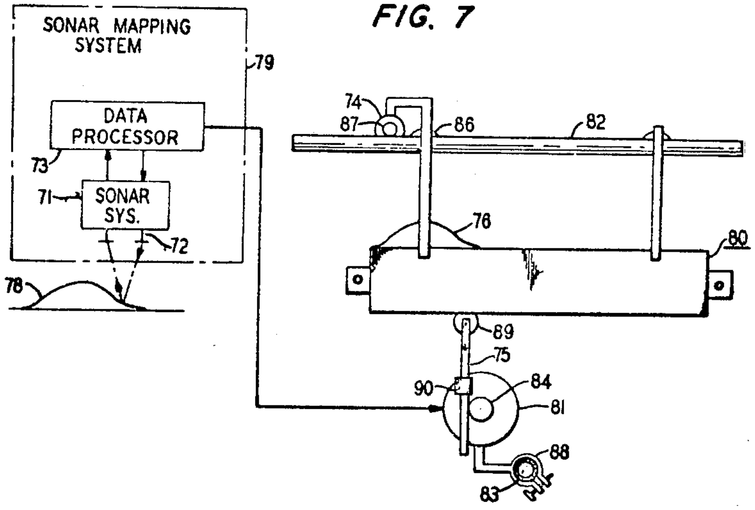
FIG. 7 is a system using the device of FIG. 6 in conjunction with a sonar mapping system to form a model of a section of ocean floor being mapped.

FIG. 7 shows the rectangular configuration of the device 80 being used as a storage device for a sonar mapping system 79. A sonar mapping system suitable for use with applicant's storage device is shown in the F. J. Murphee Patent 3,363,226, issued Jan. 9, 1968. However, instead of using the motor to move a stylus and record a line on moving paper, as is done in Murphee, applicant's storage device is moved over a strand displacement arm which is moved by a motor. This operates in a manner analogous to the helical recorder of Murphee, the only difference being that the recording is done by displacing strands rather than drawing a line on paper.

Referring to FIG. 7, applicant's storage device 80 is mounted on parallel tracks 82, and an identical track not shown, by means of four supports. One support is attached to each corner of the outer surface of the device 80, and each being identical to support 85. At the top of each support is a flange identical to flange 86, which fits into a groove in each of the parallel tracks. A variable speed reversible motor 74 is stationarily mounted on support 85. The motor has a friction wheel 87 attached to its commutator shaft that is in contact with the upper surface of track 82.

Consequently, when the motor is turned on, the friction wheel 87 turns, and moves the storage device in one direction or the other along track 82. By reversing the direction the motor 84 rotates, the direction the device 80 moves along the track is reversed.

Figure 9:
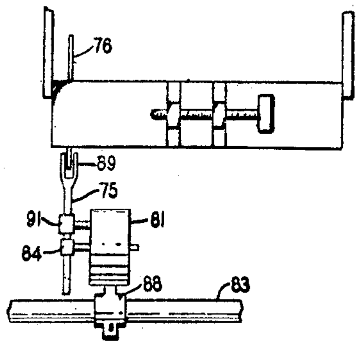

FIG. 7 also shows the strand displacement arm 75 and the arm displacement motor 81. The arm 75 is controlled by a friction wheel 84 which is attached to the commutator shaft of the motor 81. The motor 81 is mounted on a track 83 running perpendicular to the surface of the drawing. The motor is mounted by means of a clamp 88 which, when loosened, allows the motor 81 to be moved along track 83. In effect, this allows the positioning of arm 75 along track 82 beneath the lower surface of the storage device 80. A more detailed view of the motor 81, associated apparatus, and the storage device 80, rotated 90° from the FIG. 7 position, is shown in FIG. 9.

Figure 8:
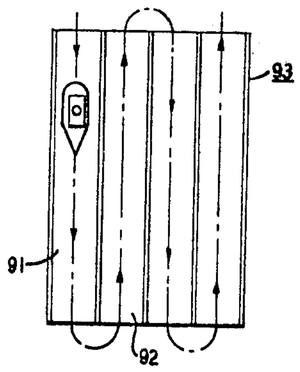
FIGS. 8 and 9 are useful in explaining the operation of the system shown in FIG. 7.

FIG. 8 shows a ship and an area of the sea of which a three dimensional scale model or replica of the floor beneath it is desired. This area 93 is divided into four sectors whose width is determined by the directivity of the sonar to be used and the width of wheel 89 (FIG. 9) attached to arm 75. It should be noted that wheels of various width may be used and this will have an effect on the accuracy and scale of the resulting replica. Also, the width of the wheel 89 (FIG. 9) used is related to the directivity of the sonar.

As the ship enters sector 91, it will be traveling at a constant speed. At this same time, the motor 74 (FIG. 7) will be turned on, and the storage device 80, which has been previously selectively positioned on the track over the arm 75, will begin to move along the track at a constant speed. The speed at which the storage device 80 (FIG. 7) moves along the track 82, is related to the speed of the motor 74, which in turn is based on the ship's speed and the scale factor involved. For instance, if the storage device 80 had been initially positioned with its leftmost strands 76 over arm 75 when the ship entered sector 91 (FIG. 8), the leftward movement of the storage device 80, in synchronism with the rightward motion of the ship's sonar system 79 over the sea floor, would produce the strand displacement shown in FIG. 7. This displacement is a scale replica of the sea floor 78 (FIG. 7) over which the sonar system 79 has moved.

As the sonar receives pulses, or echoes, these are translated into electrical signals and transmitted to the data processor 73 (FIG. 7). The data processor, operating as described in the Murphee patent, in turn sequentially transmits electrical signals related to the distance information contained in the sonar returns to the motor 81. The motor 81 responds to these signals by displacing the arm 75 vertically a distance which is also related to the distances indicated by the sonar returns. This, in turn, brings the wheel 89 (FIG. 7) at the end of arm 75 into contact with the bottom cross sectional surfaces of the strands 81 (FIG. 7) and displaces them upwardly as shown.

While FIG. 9 merely shows the arm 75 (FIG. 9) attached to the motor 81 by means of a bracket 90 for purposes of clarity, there are numerous well known devices, similar to the helical recorder of Murphee, that provide the mechanical balance and inertia required for the arm 75 to respond evenly and smoothly when signals are applied to a motor.

As the ship (FIG. 8) continues along sector 91, the sonar continues to transmit, echoes are received and processed. The resulting sequence of signals are applied to the motor 81 (FIG. 7) causing the arm 75 to move up and down, in proportion to the amplitudes of the signals, displacing the strands 76 accordingly. If the entire operation is properly synchronized and the scale factors are correct, the rightmost strands of the storage device 80 (FIG. 7) will be over the arm 75 when the ship reaches the end of sector 81. At this point, the motor 74 and the sonar 71 are turned off. The motor 81 (FIG. 9) is moved to the right along the shaft 83 a distance determined by the width of the wheel 89, the scale being used and the directivity of sonar. When this has been completed, the ship enters sector 92 traveling the direction indicated. The motor 74 (FIG. 7) is turned on at this point with its direction of rotation being reversed from what it was during the run in sector 91 (FIG. 8). This moves the storage device from left to right in FIG. 7. Similarly, the sonar is turned on again and the process described above for the run over sector 91 (FIG. 7) is repeated. Since the motor 81 has been moved, the arm 75 (FIG. 7) will begin displacing strands 76 contiguous to those displaced during the run of the ship in sector 91 (FIG. 8).

When the ship has completed its run over the four sectors shown in FIG. 8, a three dimensional scale model or replica of the sea floor below that area will be stored in the storage device 80 (FIG. 7). At this point, the retaining sleeve may be tightened, locking the strands 76 in place, and casts of the replica may be made if desired.

While the preceding discussion has been in terms of using the storage device with a sonar mapping system to create a three dimensional replica of an area of the sea floor, it is clear that any system capable of scanning contours and translating the resulting information into mechanical movement could be used succesfully with the storage device. For example, the sonar mapping system could be replaced with an equivalent airborne radar mapping system and terrain models could be made.

SUMMARY

The above discussion has shown numerous embodiments and uses of the invention. First, the device is of such a nature that it finds acceptance as a novelty or toy. Its appeal in this area may be enhanced by the selection of a retaining sleeve, strands, et cetera, having appealing physical qualities such as color, shape, et cetera. Additionally, the device finds application in the fields of art, displays, and industrial mold making. A still further application of the invention is its use, in conjunction with various types of contour mapping equipment, as a device for storing three dimensional terrain maps or similar models.

It should be noted that the above described embodiments are only illustrative examples of the numerous and varied forms the image storage device may take. Additionally, the different uses described are merely indicative of the potential utility of the device. Clearly, to one skilled in the art, numerous other embodiments and uses, all of which are within the scope and spirit of the invention, will become readily apparent as a result of reading the disclosure.

What I claim is:

1. The method of forming a three dimensional replica of an object comprising the steps of:

aligning the cross sectional surfaces of a plurality of strands contained in a retaining sleeve under a selected pressure in the same plane;

transmitting acoustical pulses toward said object's surface contours;

detecting the acoustical pulses reflected from said surface contours when struck by said transmitted pulses;

translating said detected acoustical pulses into electrical pulses; and moving an arm in contact with selected strand cross sections through a selected distance in response to the application of said electrical signals.

2. The method of forming a three dimensional replica of an object comprising the steps of:

aligning the cross sectional surfaces of a plurality of strands contained in a retaining sleeve under a selected pressure in the same plane;

transmitting electromagnetic pulses toward said object's surface contours;

detecting the electromagnetic pulses reflected by said surface contours when struck by said transmitted pulses;

translating said detected electromagnetic pulses into electrical signals; and moving an arm in contact with selected strand cross sections through a selected distance in response to the application of said electrical signals.

3. In combination:

translation means for translating selected contours of a three dimensional object into electrical signals as said means is moved over said selected contours;

an image storage device comprising a plurality of strands contained in juxtaposition in a retaining sleeve under a selected pressure exerted by said retaining sleeve, said pressure being sufficient to prevent said strands from sliding from said sleeve under the force of their own weight, but which pressure allows free movement of each of said strands when a selected additional force is applied to the end cross section of a strand;

means for moving said image storage device along a first axis in synchronism with the movement of said transmission means over a selected contour; and means responsive to said electrical signals generated by said translation means for displacing selected strands in said image storage device along a second axis as said image storage device moves along said first axis.

4. In combination:

translation means for translating selected contours of a three dimensional object into digital electrical code signals;

an image storage device comprising a plurality of strands contained in juxtaposition in a retaining sleeve under a selected pressure exerted by said retaining sleeve, said pressure being sufficient to prevent said strands from sliding from said sleeve under the force of their own weight, but which pressure allows free movement of each of said strands when a selected additional force is applied to the end cross section of a strand;

displacement means responsive to said digital electrical code signals generated by said translation means for displacing selected strands in said image storage device along one axis; and means for producing a relative movement between said image storage device and said displacement means along another axis in synchronism with the application of digital electrical code signals from said translation means.

References Cited

UNITED STATES PATENTS

| | | | |
|---|---|---|---|
| 2,386,199 | 10/1945 | Dominick | 35—41 |
| 2,410,888 | 11/1946 | Lucy | 264—219 |
| 2,616,077 | 10/1952 | Holser. | |
| 2,881,486 | 4/1959 | Soref. | |
| 3,219,307 | 11/1965 | Leeds et al. | 249—140 XR |
| 3,358,389 | 12/1967 | Ruderfer | 35—41 XR |
| 3,363,226 | 1/1968 | Murphree | 340—3 |

FOREIGN PATENTS

| | | |
|---|---|---|
| 8,662 | 4/1901 | Great Britain. |
| 1,237,688 | 6/1960 | France. |

RODNEY D. BENNETT, Primary Examiner

H. C. WAMSLEY, Assistant Examiner

U.S. Cl. X.R.

340—3